United States Patent [19]
Tollison

[11] Patent Number: 5,354,465
[45] Date of Patent: Oct. 11, 1994

[54] LARGE CAPACITY FILTER SYSTEM

[76] Inventor: John W. Tollison, P.O. Box 1089, Anderson, S.C. 29622

[21] Appl. No.: 78,631

[22] Filed: Jun. 21, 1993

[51] Int. Cl.⁵ ............................................. B01D 35/02
[52] U.S. Cl. ..................................... 210/305; 210/307; 210/310; 210/460; 4/290; 4/DIG. 14; 4/DIG. 19
[58] Field of Search .................... 4/286, 287, 288, 289, 4/290, 291, 292, DIG. 14, DIG. 19; 210/294, 295, 299, 301, 305, 307, 310, 459, 460, 513, 521, 532.1, 538

[56] References Cited
U.S. PATENT DOCUMENTS

| | | | |
|---|---|---|---|
| 2,545,301 | 3/1951 | O'Donnell | 210/299 |
| 3,374,894 | 3/1968 | Webster | 210/305 |
| 3,756,410 | 9/1973 | Moody et al. | 210/305 |
| 4,045,351 | 8/1977 | Peterson | 210/238 |
| 4,113,617 | 9/1978 | Bereskin et al. | 210/299 |
| 4,333,835 | 6/1982 | Lynch | 210/305 |
| 4,400,274 | 8/1983 | Protos | 210/305 |
| 4,949,406 | 8/1990 | Canelli | 4/288 |

Primary Examiner—Robert A. Dawson
Assistant Examiner—W. L. Walker
Attorney, Agent, or Firm—Gerald R. Boss; Cort Flint

[57] ABSTRACT

A large capacity filter assembly A comprising of a housing B, a filter chamber C, and a horizontal trap chamber D. Water flowing from industrial drain line 10 enters housing B, flows through filter chamber C, ingress horizontal trap chamber D and exits housing B. Horizontal trap chamber D is disposed within housing interior 12 for trapping noxious odors stemming from the drain line and preventing the noxious odors from permeating through housing inlets 16. Horizontal trap chamber D includes horizontal baffle plate 28, first vertical trap channel opening 32, first vertical trap channel 38, first horizontal trap channel 36, second vertical trap channel 44, second horizontal trap channel 42, and airspace 46.

19 Claims, 3 Drawing Sheets

LARGE CAPACITY FILTER SYSTEM

BACKGROUND OF THE INVENTION

The invention relates to an industrial drain line filter system which removes food particles and the like from the drain line's associated water flow, and in particular, to a housing having a self-contained filter and horizontal trap system which can accommodate the water flow of several drain lines.

Filter systems are incorporated within drain lines to filter out food particles and the like from the drain line and prevent them from clogging. Sink drain filters have been used in residential settings. U.S. Pat. No. 4,045,351 illustrates a sink filter system which is incorporated into a residential drain line between the sink drain and the drain trap. This filter utilizes the drain trap already existing within the drain line and lies in the path of the water flowing through the drain line. Consequently, this filter has limited capacity and is designed only for use with one drain line.

U.S. Pat. No. 4,949,406 illustrates another residential sink filter system incorporated into a residential drain line below the sink drain. This filter lies in the path of the water flowing through the drain line and includes a vertical trap which is attached to horizontal plumbing normally connected to a drain trap. This filter is designed only for use with one drain line and has limited capacity.

Both of the aforementioned patents require horizontal plumbing in ordor to provide a sufficient trap means. The requirement of horizontal plumbing limits the placement of the filter and consequently its possible effectiveness.

In an industrial setting, such as a restaurant, drains are in continuous use and a clogged drain results in loss downtime and repair bills. Thus it is advantageous to have drain filters which prevent the drains from clogging. However, in an industrial setting with multiple sinks, the use of a single filter with each sink drain is very expensive and increased plumbing associated with each drain line.

Accordingly, an object of the present invention is to provide a filter system which can effectively remove food particles and the like from industrial drain lines.

Another object of the present invention is to provide a single filter system which can effectively remove food particles and the like from multiple industrial drain lines.

Also, an object of the present invention is to provide a filter system having a self-contained odor trap resulting in minimal space requirements for the installation of the filter system.

Additionally, an object of the present invention is to provide a filter system having a self-contained odor trap enabling the placement of the filter system anywhere along the drain line.

Furthermore, an object of the present invention is to provide a single filter system having a trap system incorporated within the single filter which will enable multiple industrial drain lines to be utilized with the filter and hence reduce the amount of plumbing required to be used with the multiple industrial drain lines.

SUMMARY OF THE INVENTION

The above objectives are accomplished according to the invention by providing a large capacity filter system for the removal of food particles and the like from an industrial drain line and its associated water flow. The filter system includes a housing having an interior and at least one housing inlet for receiving the water flow and a water outlet for delivering the water out of the housing interior.

A filter chamber is disposed within the housing interior. The filter chamber is of a sufficient size to receive water from multiple housing inlets. Water is directed from the filter chamber to a removable filter. The filter removes food particles and the like from the water flow. A horizontal trap chamber is disposed beneath the removable filter. The horizontal trap chamber includes a plurality of baffles which are offset and extend past each other defining an odor containment reservoir whereby a residual amount of water flowing into the housing is retained by the baffles. The water retained in the odor containment reservoir prevents any odor permeating from the drain line to pass through the filter housing and into the sink.

An air space is located intermediary the odor containment reservoir and the housing outlet. This air space is defined by the plurality of baffles. The air space functions as a reservoir for the water exiting the housing, enabling the housing to receive multiple drain lines without backing up.

Through the incorporation of a horizontal trap, the horizontal piping common to the customary sink drain is not required. This enables the drain line to be comprised only of straight pipe. Such a configuration reduces the piping costs by removing the horizontal plumbing previously required for a trap. Additionally less space is required due to the removal of a horizontal pipe. The filter system may be placed anywhere within the drain line i.e. close to the sink or in an industrial setting close to a grease trap. The only horizontal space required for the filter system is defined by the width of the filter housing.

Thus it can be seen that a more advantageous filter housing for industrial sink lines may be had according to the invention. Through a large capacity filter system which incorporates a horizontal trap system utilizing an air space, multiple drain lines may be attached to a single filter system. Such a single system reduces the cost of multiple, independent filter systems previously required for each drain line, and enables multiple drain lines to flow through a single drain line once the water has passed through the filter system. This configuration enabled by the invention reduces the amount of plumbing required for multiple sink drain lines, and reduces the overall space required to provide adequate drain lines and filter systems for multiple sink drain lines.

DESCRIPTION OF THE DRAWINGS

The construction designed to carry out the invention will hereinafter be described, together with other features thereof. the invention will be more readily understood from a reading of the following specification and by reference to the accompanying drawings forming a part thereof, wherein an example of the invention is shown and herein.

The construction designed to carry out the invention will hereinafter be described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Figure 1:
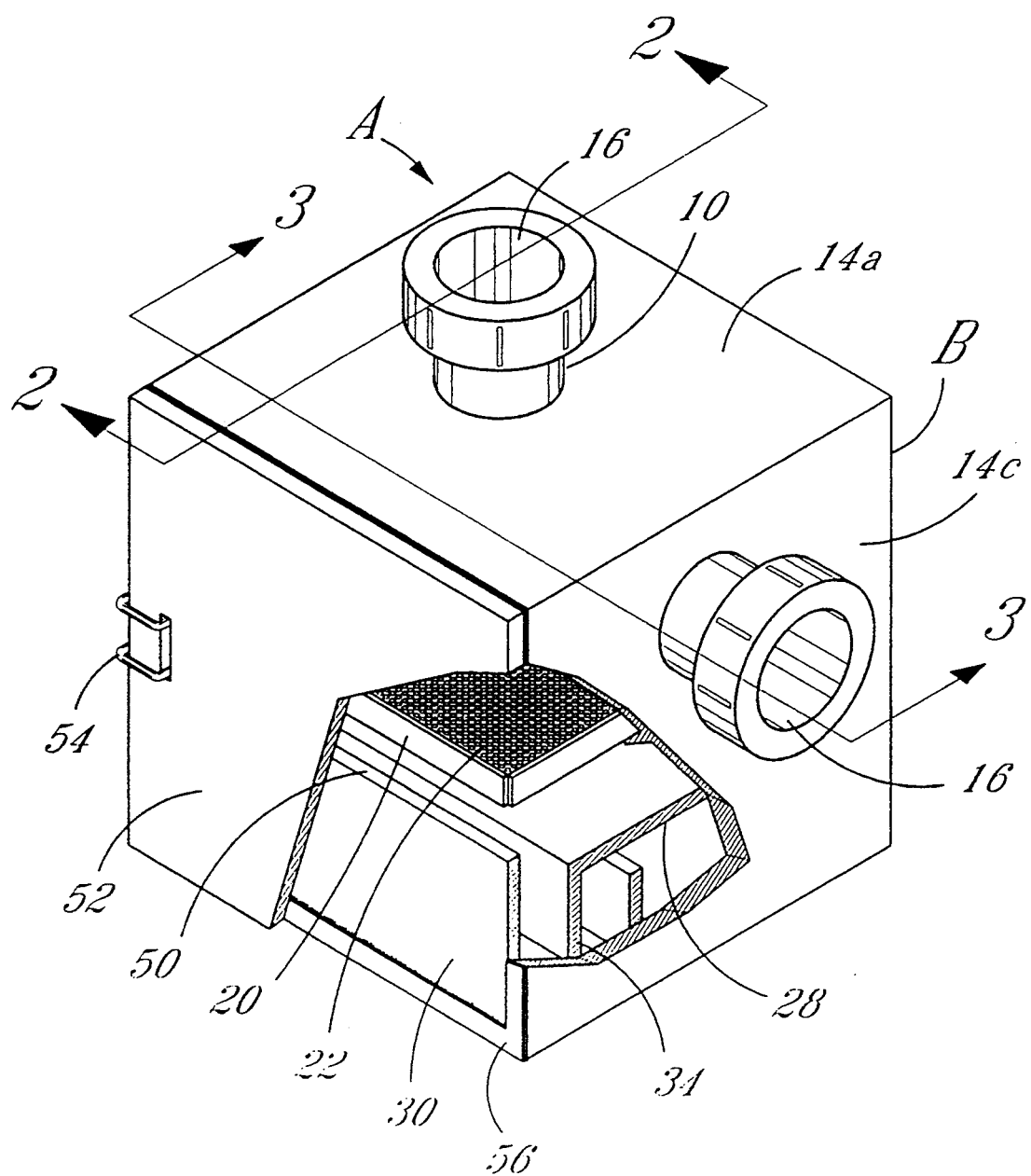
FIG. 1 is a perspective view illustrating the large capacity filter assembly with multiple inlets.
Figure 2:
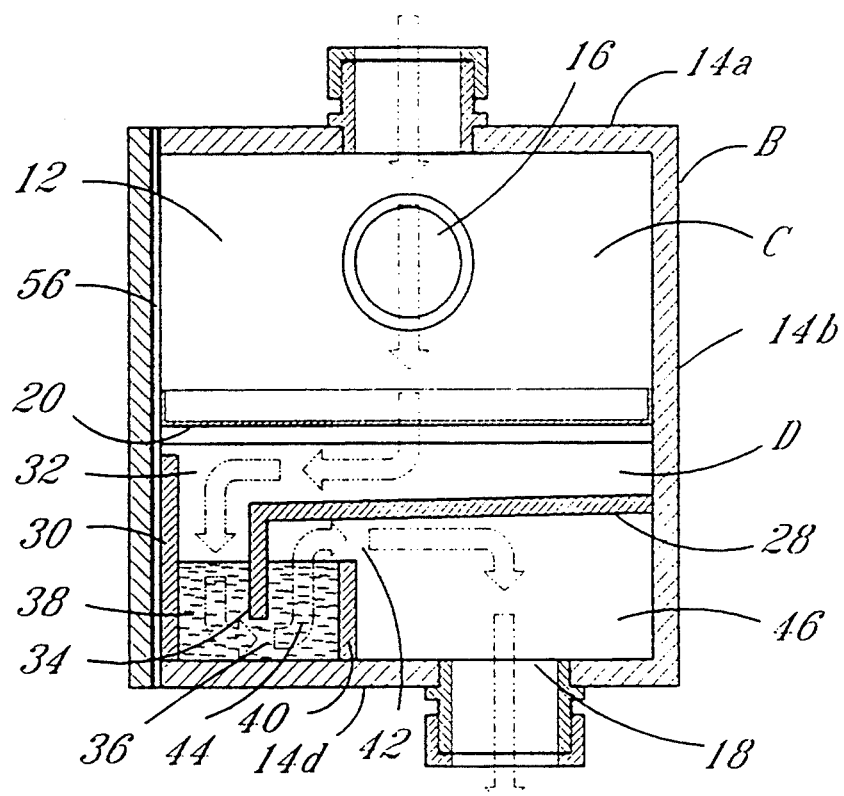
FIG. 2 is a sectional view taken along line 2—2 of FIG. 1 illustrating the filter chamber and the horizontal trap chamber of the large capacity filter.
Figure 3:
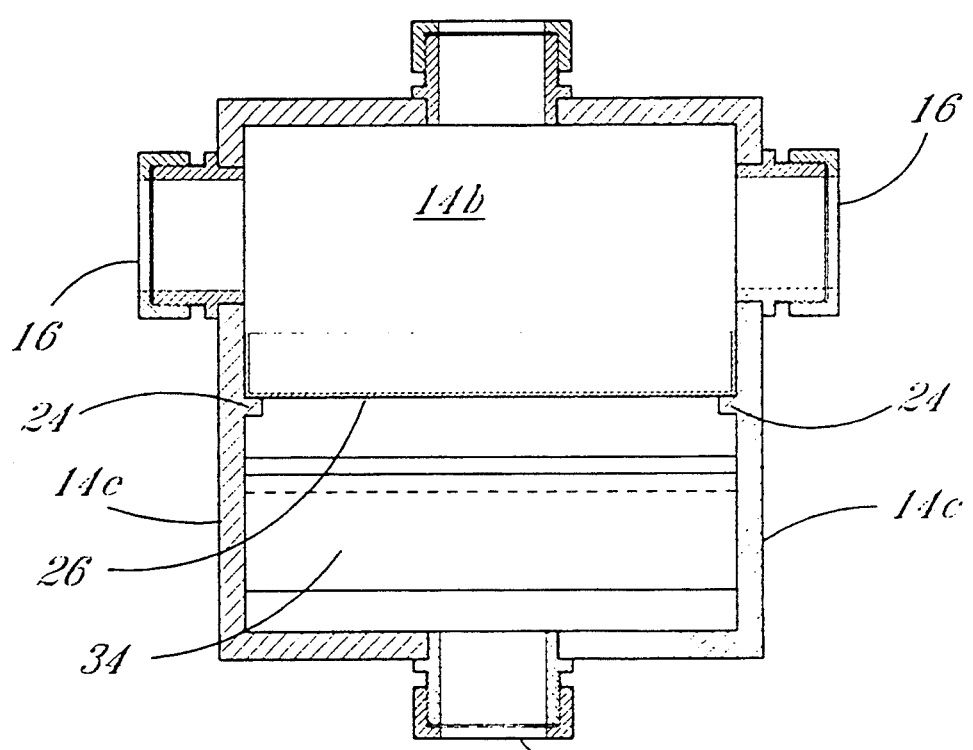
FIG. 3 is a sectional view taken along line 3—3 of FIG. 1 illustrating the interior of the large capacity filter.

Referring now in more detail to the drawings, as shown in FIGS. 1, 2, and 3 a large capacity filter assembly A is shown comprising a housing B, a filter chamber C, and a horizontal trap chamber D. Water flowing from industrial drain line 10 enters housing B, flows through filter chamber C, ingress horizontal trap chamber D and exits housing B.

Housing B has an interior 12 which is defined by housing walls 14a, 14b, 14c, 14e and bottom chamber wall 14d. Housing B also includes housing inlets 16 which receives water flowing from industrial drain line 10 and a housing outlet 18 which delivers the water from housing interior 12. Housing outlet 18 is comprised of a threaded outlet of standard size which will hook up with standard plumbing.

Filter chamber C is disposed within housing interior 12 for the filtering of food particles from the drain line. Filter chamber C includes a filter 20 which is removable. Filter 20 contains passages 22 which allow the water to flow through the filter while retaining any food particles and the like. Passages 22 may be of variable sizes depending upon the type of food particles passed through the system. For fine particles such as grits, a nylon hose may be placed over the filter for screening. Filter 20 is supported by supports 24 which horizontally co-extend along housing interior 12. A chamber outlet 26 allows the water to pass through filter chamber C into horizontal trap chamber D.

Horizontal trap chamber D is disposed within housing interior 12 for trapping noxious odors stemming from the drain line and preventing the noxious odors from permeating through housing inlets 16. Horizontal trap chamber D includes a horizontal baffle plate 28 which is slightly sloped. Containment wall 30 extends from the base of the housing. Horizontal baffle plate 28 terminates short of containment wall 30 creating a first vertical trap channel opening 32. First baffle 34 is integral with and extends downwardly from horizontal baffle plate 28 towards bottom chamber wall 14d. First baffle 34 terminates short of bottom chamber wall 14d forming a first horizontal trap channel 36. First baffle 34 is also offset from containment wall 30 forming a first vertical trap channel 38. First vertical trap channel opening 32 is in fluid communication with first vertical trap channel 38. Second baffle 40 terminates short of horizontal baffle plate 28 forming a second horizontal trap channel 42. Second baffle 40 is also offset from first baffle 34 forming a second vertical trap channel 44. Second baffle 40 is intermediary first baffle 34 and housing outlet 18. An airspace 46 is defined within the profiles of horizontal baffle plate 28, first baffle 34, second baffle 40 and housing B.

Horizontal trap chamber D is configured such that when water enters horizontal trap chamber D the water first encounters horizontal baffle plate 28 and enters the following passages sequentially: first vertical trap channel opening 32; first vertical trap channel 38; first horizontal trap channel 36; second vertical trap channel 44; second horizontal trap channel 42; airspace 46; and housing outlet 18.

As shown in FIG. 2, first baffle 34 and second baffle 40 extend past each other. This configuration in combination with containment wall 30 form odor containment reservoir 48. When the water ceases entering housing inlets 16, a residual amount of water is retained within odor containment reservoir 48. Horizontal baffle plate 28 extends over housing outlet 18 and between housing inlets 16 and housing outlet 18. Horizontal baffle plate 28 is also integral with walls 14b, 14c, and 14e and extends over second baffle 40. Second baffle 40 is integral with walls 14c and 14e. Consequently when water is retained within odor containment reservoir 48, no direct air passage exists within housing B from housing outlet 18 to housing inlets 16 thereby any odor entering housing B from housing outlet 18 is trapped by odor containment reservoir 48.

Figure 1A:
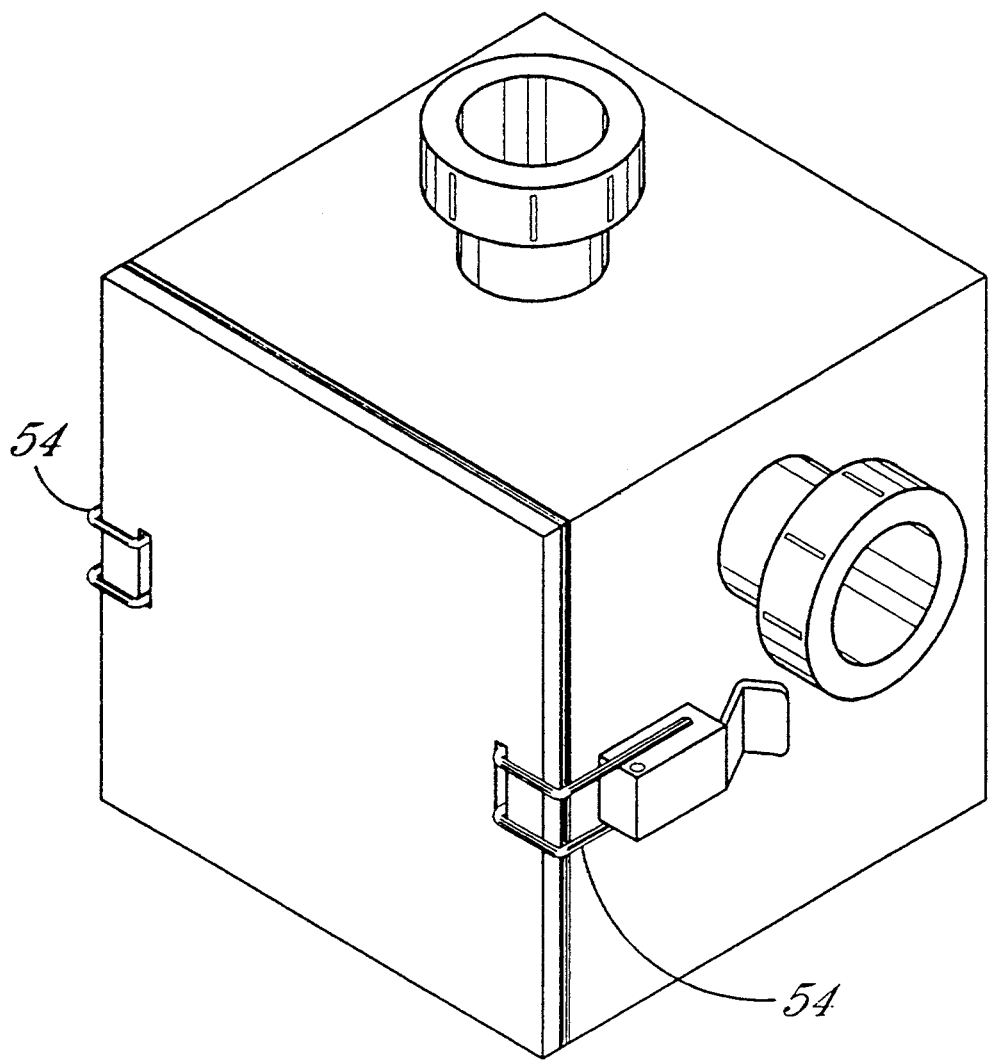
FIG. 1a is a side view of the large capacity filter assembly.

As shown in FIG. 1, filter removal opening 50 having an opening of sufficient size allowing for the removal of filter 20 from housing interior 12 is integral with housing B. A door 52 encloses filter removal opening 50. As shown in FIG. 1a door 52 is latched to both sides of housing B by pivotal latches 54. A gasket 56 seals door 52 with filter removal opening 50 providing a water tight seal. Latches 54 may be unlocked allowing door 52 to be removed from housing B and enabling filter 20 to be removed from housing interior 12. Containment wall 30 enables door 52 to be removed from housing B while preventing the water retained in odor containment reservoir 48 from flowing out of the housing and thereby emptying the trap. Containment wall 30 is of a height at least equal to the length of second baffle 30 in order to contain the water in odor containment reservoir 48.

By including air space 46 within horizontal filter chamber D, a minimum amount of residual water is retained within odor containment reservoir 48 allowing filter assembly A to facilitate multiple drain lines. Air space 46 acts as a temporary reservoir for the water flow of the multiple drain lines until the water exits housing B through housing outlet 18 enabling water from multi-drain lines to enter housing B while preventing back up. Additionally, by minimizing the water retained in odor containment reservoir 48, the maximum water retention capacity of horizontal trap chamber D is realized.

In the preferred embodiment three 2 inch drain lines enter housing B. Since large capacity filter assembly A utilizes a gravity drain system, it is impossible to predict the water flow rate entering housing B due to the nature of the plumbing. However, by providing multiple housing inlets 16 with air space 46, multiple water flows may simultaneously enter housing B with their associated flow rates adjusted accordingly to prevent flooding. Furthermore, by providing large capacity filter assembly A, multiple drain lines may utilize a single filtering system, thereby reducing the cost of having independent filters for each respective drain line. Additionally, by including a horizontal trap chamber D, the additional plumbing generally required to provide a trap is no longer required. Hence, less plumbing and space is required to adequately drain and filter the water flow from multiple industrial drain lines.

While a preferred embodiment of the invention has been described using specific terms, such description is for illustrative purposes only, and it is to be understood that changes and variations may be made without departing from the spirit or scope of the following claims.

What is claimed is:

1. A large capacity filter assembly for the removal of food particles and the like from an industrial drain line and associated water flow, said assembly comprising:
   a housing having an interior and at least one housing inlet for receiving said water from said industrial drain line and a housing outlet for delivering said water from said housing interior;
   a filter chamber disposed within said housing interior having a chamber outlet for delivering said water from said filter chamber;
   a removable filter disposed generally horizontal in said filter chamber coextending generally across said chamber outlet for removing and collecting said food particles from said water flow;
   a filter removal opening included in said housing allowing for the removal of said filter from said filter chamber;
   a horizontal trap chamber disposed below said chamber outlet having an odor containment reservoir, said horizontal trap chamber being in fluid communication with said housing outlet;
   a plurality of baffles disposed within said horizontal trap chamber defining said odor containment reservoir whereby a residual amount of water flowing into said housing is retained by said baffles in said odor containment reservoir;
   an airspace defined by said plurality of baffles between said odor containment reservoir and said housing outlet.

2. The assembly of claim 1 wherein said plurality of baffles includes a generally horizontal baffle plate received within said interior of said housing directing said water from said chamber outlet to said horizontal trap chamber.

3. The assembly of claim 2 wherein said housing includes at least one housing wall, said horizontal baffle plate terminating short of said housing wall forming a first vertical trap channel opening.

4. The assembly of claim 3 wherein said horizontal trap chamber includes a bottom chamber wall, and including a first baffle integral and extending downwardly from said horizontal baffle plate, said first baffle terminating short of said bottom chamber wall forming a first horizontal trap channel.

5. The assembly of claim 4 including a second baffle terminating short of said horizontal baffle plate forming a second horizontal trap channel.

6. The assembly of claim 5 wherein said second baffle is disposed between said first baffle and said housing exit, said second baffle in conjunction with said first baffle forming a second vertical trap channel.

7. The assembly of claim 6 wherein said first and said second baffles have respective ends which extend past each other.

8. The assembly of claim 6 wherein said first baffle and said second baffle define said odor containment reservoir.

9. The assembly of claim 2 wherein said horizontal baffle plate is sloped.

10. The assembly of claim 1 including a gasket and a removable door for enclosing said filter removal opening, said gasket providing a water-tight seal.

11. The assembly of claim 1 wherein said housing includes multiple inlets which receive multiple drain lines.

12. A large capacity filter assembly for the removal of food particles and the like from an industrial drain line and associated water flow, said assembly comprising:
   a housing having an interior, at least one housing wall and at least one housing inlet for receiving said water from said industrial drain line and a housing outlet for delivering said water from said housing interior;
   a filter chamber disposed within said interior of said housing having a chamber outlet for delivering said water from said filter chamber;
   a removable filter carried between said housing inlet and said chamber outlet for removing said food particles from said water flow;
   a horizontal trap chamber disposed under said chamber outlet being in fluid communication with said housing outlet, and having a chamber bottom wall;
   a horizontal baffle plate disposed below said chamber outlet between said chamber outlet and said housing outlet, said horizontal baffle plate terminating short of said housing wall forming a first vertical trap channel opening;
   a first baffle depending downwardly from said horizontal baffle plate and being laterally offset from said housing wall forming a first vertical trap channel, said first vertical trap channel being in fluid communication with said first vertical trap channel opening;
   said first baffle terminating short of said chamber bottom wall to define a first horizontal trap channel, said first horizontal trap channel being in fluid communication with said first vertical trap channel;
   a second baffle terminating short of said horizontal baffle and disposed between said first baffle and said housing outlet;
   a second vertical trap channel formed between said second baffle and said first baffle being in fluid communication with said first horizontal trap channel;
   a second horizontal trap channel formed within said offset of said second baffle and said horizontal baffle in fluid communication with said second vertical trap channel;
   said first and second baffle walls defining said odor containment reservoir;
   an airspace defined by said horizontal baffle plate, and said first and second baffles, said airspace being intermediary of said odor containment reservoir and said housing outlet.

13. The assembly of claim 12 wherein said first baffle and said second baffle have respective ends which extend past each other.

14. The assembly of claim 12 wherein said first and second baffles are integral with said housing wall.

15. The assembly of claim 12 wherein said filter horizontally co-extends along said housing interior thereby preventing said food particles from entering said horizontal trap chamber.

16. The assembly of claim 12 wherein said housing includes multiple inlets which receive multiple drain lines.

17. The assembly of claim 12 including a filter removal opening included in said housing of sufficient size allowing for the removal of said filter from said filter chamber, a door latched to said housing for covering said filter removal opening, a gasket providing a water tight seal when said door covers said filter removal opening.

18. A large capacity filter assembly for the removal of food particles and the like from multiple industrial drain lines and associated water flows, said assembly comprising:

a housing having an interior, at least one housing wall and multiple inlets for receiving said water from said multiple industrial drain lines and a housing outlet for delivering said water from said housing interior;

a filter chamber disposed within said housing interior being of a sufficient capacity to facilitate the containment and filtering of said multiple water flows received from said multiple inlets, said filter chamber having a chamber outlet for delivering said water from said filter chamber;

a removable filter carried between said inlets and said chamber outlet for removing said food particles from said water flow;

a filter removal opening having a sufficient size allowing for the removal of said filter from said filter chamber;

a horizontal trap chamber disposed under said chamber outlet having an odor containment reservoir for preventing the back flow of odor through said housing, said horizontal trap chamber being in fluid communication with said housing outlet;

a horizontal baffle plate received within said interior or said housing disposed below said chamber outlet, said horizontal baffle plate directing said water from said chamber outlet to said horizontal trap chamber;

a plurality of baffles disposed within said horizontal trap chamber defining said odor containment reservoir whereby a residual amount of water flowing into said housing is retained by said baffles in said odor containment reservoir;

an airspace defined by said plurality of baffles between said odor containment reservoir and said housing outlet, said airspace having a sufficient size that facilitates the filtering of said multiple water flows received from said multiple inlets.

19. The assembly of claim 18 wherein said horizontal baffle plate terminates short of said housing wall forming a first vertical trap channel opening;

said plurality of baffles including a first baffle depending downwardly from said horizontal baffle plate and being laterally offset from said housing wall forming a first vertical trap channel, said first vertical trap channel being in fluid communication with said first vertical trap channel opening;

said first baffle terminating short of said chamber bottom wall to define a first horizontal trap channel, said first horizontal trap channel being in fluid communication with said first vertical trap channel;

a second baffle terminating short of said horizontal baffle plate and disposed between said first baffle and said housing outlet;

a second vertical trap channel formed between said second baffle and said first baffle being in fluid communication with said first horizontal trap channel;

a second horizontal trap channel formed within said offset of said second baffle and said horizontal baffle plate in fluid communication with said second vertical trap channel.

* * * * *